US009775361B2

(12) United States Patent
Inoue et al.

(10) Patent No.: US 9,775,361 B2
(45) Date of Patent: Oct. 3, 2017

(54) INCISION MAKING APPARATUS AND INCISION MAKING METHOD

(71) Applicant: MAYEKAWA MFG. CO., LTD., Tokyo (JP)

(72) Inventors: Noriyuki Inoue, Tokyo (JP); Shinji Hane, Tokyo (JP); Kenichi Oka, Tokyo (JP); Koji Takanashi, Tokyo (JP); Naoki Toyoda, Tokyo (JP); Hiroyuki Sakurayama, Tokyo (JP); Noriyuki Takahashi, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 15/322,729

(22) PCT Filed: Jun. 25, 2015

(86) PCT No.: PCT/JP2015/068361
§ 371 (c)(1),
(2) Date: Dec. 29, 2016

(87) PCT Pub. No.: WO2016/002631
PCT Pub. Date: Jan. 7, 2016

(65) Prior Publication Data
US 2017/0127690 A1 May 11, 2017

(30) Foreign Application Priority Data

Jun. 30, 2014 (JP) .................................. 2014-134088

(51) Int. Cl.
*A22C 21/00* (2006.01)
*B26D 3/24* (2006.01)
(Continued)

(52) U.S. Cl.
CPC ...... *A22C 21/0023* (2013.01); *A22C 21/0046* (2013.01); *A22C 21/0053* (2013.01);
(Continued)

(58) Field of Classification Search
CPC ... A22C 21/00; A22C 21/0023; A22C 21/003; A22C 21/0046; A22C 21/06
See application file for complete search history.

(56) References Cited

U.S. PATENT DOCUMENTS 4,597,136 A * 7/1986 Hazenbroek ....... A22C 21/0023
452/169
4,856,143 A 8/1989 Callsen et al.
(Continued)

FOREIGN PATENT DOCUMENTS

JP          H067074         1/1994
JP          H11266780       10/1999
(Continued)

OTHER PUBLICATIONS

"Search Report of Europe Counterpart Application", dated May 16, 2017, p. 1-p. 7, in which the listed references (US patent No. 1 & US application No. 1) were cited.
(Continued)

*Primary Examiner* — Richard Price, Jr.
(74) *Attorney, Agent, or Firm* — Jiang Chyun Intellectual Property Office

(57) ABSTRACT

A shoulder incision-making apparatus for a poultry carcass according to the present invention is for cutting a shoulder joint section of a poultry carcass, and includes: a fixing jig on which a poultry carcass which is eviscerated and which has leg parts removed is to be placed and fixed; a conveyer forming a conveyance path of the fixing jig and configured to convey the fixing jig along the conveyance path; a first cutter disposed in the conveyance path; and a second cutter
(Continued)

disposed in the conveyance path at a downstream side of the first cutter in a conveying direction. The first cutter is configured to make an incision on the shoulder joint section of the poultry carcass, and the second cutter is configured to be inserted into the incision to cut the shoulder joint section.

8 Claims, 11 Drawing Sheets

(51) Int. Cl.
    *G01B 11/24*     (2006.01)
    *G06T 7/60*     (2017.01)

(52) U.S. Cl.
    CPC ............ *A22C 21/0069* (2013.01); *B26D 3/24* (2013.01); *G01B 11/24* (2013.01); *G06T 7/60* (2013.01); *G06T 2207/10004* (2013.01)

(56) References Cited

U.S. PATENT DOCUMENTS

| | | | |
|---|---|---|---|
| 4,873,746 A * | 10/1989 | Scheier | A22C 21/0069 452/136 |
| 4,993,115 A | 2/1991 | Hazenbroek | |
| 5,312,291 A * | 5/1994 | van den Nieuwelaar | A22C 21/0053 452/165 |
| 5,314,374 A * | 5/1994 | Koch | A22C 21/0053 452/136 |
| 5,407,383 A * | 4/1995 | Diesing | A22C 21/0023 452/165 |
| 5,733,184 A * | 3/1998 | Curry | A22C 21/0023 452/111 |
| 5,954,574 A * | 9/1999 | Verrijp | A22C 21/0023 452/169 |
| 5,984,770 A * | 11/1999 | Asano | A22C 21/0053 452/165 |
| 6,007,416 A * | 12/1999 | Janssen | A22C 21/003 452/135 |
| 6,059,648 A | 5/2000 | Kodama et al. | |
| 6,935,942 B1 | 8/2005 | Evers et al. | |
| 8,277,294 B2 * | 10/2012 | Van Hillo | A22C 21/0076 452/148 |
| 8,764,525 B2 * | 7/2014 | Peters | A22C 21/0069 452/165 |
| 8,801,508 B2 * | 8/2014 | Landt | A22C 21/0069 452/135 |
| 8,961,273 B2 * | 2/2015 | Connell | A22C 21/0069 452/125 |
| 2006/0270331 A1 | 11/2006 | Fujiwara et al. | |
| 2007/0111648 A1 | 5/2007 | Martel et al. | |
| 2009/0275275 A1 | 11/2009 | Evers | |
| 2012/0231716 A1 | 9/2012 | Janssen et al. | |

FOREIGN PATENT DOCUMENTS

| | | |
|---|---|---|
| JP | 2002527088 | 8/2002 |
| JP | 2010501169 | 1/2010 |
| JP | 2011125317 | 6/2011 |
| JP | 2011177096 | 9/2011 |
| JP | 2012249599 | 12/2012 |
| JP | 2013046632 | 3/2013 |
| WO | 9856254 | 12/1998 |
| WO | 0076323 | 12/2000 |
| WO | 2004052107 | 6/2004 |

OTHER PUBLICATIONS

"Search Report of Europe Counterpart Application", dated Jun. 1, 2017, p. 1-p. 10, in which the listed references (US patent No. 2 & foreign patent No. 1-2) were cited.

"International Preliminary Report on Patentability" issued to PCT/JP2015/068358, dated Jan. 3, 2017, with English translation thereof, pp. 1-17.

"International Preliminary Report on Patentability" issued to PCT/JP2015/068359, dated Jan. 3, 2017, with English translation thereof, pp. 1-18.

"International Preliminary Report on Patentability" issued to PCT/JP2015/068360, dated Jan. 3, 2017, with English translation thereof, pp. 1-16.

"International Preliminary Report on Patentability" issued to PCT/JP2015/068361, dated Jan. 3, 2017, with English translation thereof, pp. 1-17.

"International Search Report (Form PCT/ISA/210)", dated Oct. 6, 2015, with English translation thereof, pp. 1-2.

* cited by examiner

INCISION MAKING APPARATUS AND INCISION MAKING METHOD

CROSS-REFERENCE TO RELATED APPLICATION

This application is a 371 application of the international PCT application serial no. PCT/JP2015/068361, filed on Jun. 25, 2015, which claims the priority benefits of Japan application no. 2014-134088, filed on Jun. 30, 2014. The entirety of each of the above-mentioned patent applications is hereby incorporated by reference herein and made a part of this specification.

TECHNICAL FIELD

The present disclosure relates to an incision-making apparatus and an incision-making method for a poultry carcass of a fowl such as a chicken.

BACKGROUND ART

In a general process of butchering a poultry carcass of a fowl such as a chicken into a meat portion and a bone portion, butchering and deboning are performed after feather removal, blood draining, and removal of guts and the like (evisceration). Human labor cannot efficiently perform the butchering-and-deboning processes for poultry carcasses, and thus has been taken over by automated processes. For many years, the present applicant has been engaged in development of the automated deboning technologies for poultry carcasses.

In the course of automated butchering-and-deboning processes of an upper body of a poultry carcass, from which legs and guts are removed to leave only the upper body, the poultry carcass is placed and fixed on a fixing jig of a cone shape, which is referred to as a "cone", to retain an appropriate posture of the poultry carcass through the entire deboning process, as the poultry carcass is carried through a plurality of processing stations to be butchered and deboned.

The butchering-and-deboning processes include a step of separating a breast-meat portion with a wing from a bone section called "gara (waste bone)". To separate a breast-meat portion with a wing from a gara with a high yield, a meat portion is separated from a shoulder blade of a poultry carcass in a shoulder-blade incision-making step, and a body gara and an upper arm bone are cut at a shoulder joint section in a shoulder incision-making step, as a pretreatment.

Patent Document 1 discloses performing a shoulder-blade incision-making step by using a cutting blade mounted to a robot arm of four-axis control.

Patent Document 2 discloses performing a shoulder-blade incision-making step by carrying a poultry carcass fixed to a fixing jig called a carrier and using a scraper fixed so as to face a conveyor path.

Patent Document 3 discloses an automated deboning apparatus for deboning an upper body of a poultry carcass, and FIG. 8 discloses a shoulder incision-making step of cutting apart a shoulder joint section and an upper-arm bone head. Patent Document 3 discloses, in FIG. 1, providing a shoulder cutting part 22b (3rd station) for making an incision on a skin of an upper shoulder section and a shoulder incision-making part 23w (4th station) for cutting apart a shoulder joint section and an upper-arm bone head.

CITATION LIST

Patent Literature

Patent Document 1: JP2011-125317A
Patent Document 2: JP2013-046632A
Patent Document 3: WO2004/052107A

SUMMARY

Problems to be Solved

Patent Documents 1 to 3 do not disclose a specific configuration of an apparatus that enables automation of the above shoulder incision-making step for an upper body of a poultry carcass.

An object of at least one embodiment of the present invention is to provide a shoulder incision-making apparatus whereby it is possible to automate shoulder incision-making works for a poultry carcass of a fowl such as a chicken, and to improve processing efficiency at low cost.

Solution to the Problems (1) A shoulder incision-making apparatus for a poultry carcass for cutting a shoulder joint section of a poultry carcass, according to at least one embodiment of the present invention, comprises: a fixing jig on which a poultry carcass which is eviscerated and which has leg parts removed is to be placed and fixed; a conveyer forming a conveyance path of the fixing jig and configured to convey the fixing jig along the conveyance path; a first cutter disposed in the conveyance path; and a second cutter disposed in the conveyance path at a downstream side of the first cutter in a conveying direction. A plurality of the fixing jigs is mounted to the conveyer along the conveying direction of the conveyer, and a mounting part on which the poultry carcass eviscerated and having its legs removed is to be placed is erected on an upper part of each fixing jig. The first cutter is configured to make an incision on the shoulder joint section of the poultry carcass, and the second cutter is configured to be inserted into the incision to cut the shoulder joint section.

With the above configuration (1), the shoulder joint section of the poultry carcass is cut while the poultry carcass is being conveyed by the conveyor, and thus the first cutter and the second cutter are simply disposed in the conveyance path of the poultry carcass with no need to provide a device to move the cutters. Accordingly, it is possible to simplify the configuration and reduce the costs for the apparatus, and to automate incision making at low cost.

Furthermore, it is possible to perform the shoulder incision-making step successively on poultry carcasses placed on the plurality of fixing jigs carried on the conveyor, and thus to enhance processing efficiency.

Still further, shoulder incision making is performed in two stages: the first cutter firstly makes an incision on the shoulder joint section, and the second cutter is positioned readily by using the incision as a target.

(2) In some embodiments, in the above configuration (1), the fixing jig is mounted to the conveyer rotatably about a base portion of the fixing jig within a plane extending along the conveying direction, and includes an inclination-angle defining part for defining an angle of the fixing jig with respect to a horizontal direction in accordance with a position in the conveying direction so that a cutter incision position is selectable and a cutter incision amount is adjustable for the poultry carcass.

With the above configuration (2), the angle of the fixing jig with respect to the horizontal direction is defined by the inclination-angle defining part during shoulder incision making, and thereby the position of the fixing jig relative to the first cutter and the second cutter can be adjusted. Thus, it is possible to select a cutter incision position and to adjust a cutter incision amount for the poultry carcass.

(3) In some embodiments, in the above configuration (2), the inclination-angle defining part is configured to tilt the fixing jig toward the horizontal direction immediately after the second cutter cuts the shoulder joint section.

With the above configuration, it is possible to cut a shoulder joint section with the second cutter while avoiding cutting a meat portion positioned downstream of the shoulder joint section in the conveying direction.

Accordingly, it is possible to improve the product value of the meat portion downstream of the shoulder joint section after butchering.

(4) In some embodiments, in any one of the above configurations (1) to (3), each of the first cutter and the second cutter comprises a pair of blades disposed at symmetric positions in a direction intersecting with the conveying direction with respect to a center line passing through a center of the fixing jig along the conveying direction.

According to the above method (4), the blades of the first and second cutters can be easily placed on the opposite shoulder joint sections of the poultry carcass.

(5) In some embodiments, in any of the above configurations (1) to (4), each of the first cutter and the second cutter is disposed above the fixing jig and configured to be capable of moving downward toward the fixing jig. The shoulder incision-making apparatus further includes: a first driving part for moving downward the first cutter and the second cutter; a conveyance-position sensor for detecting a position of the fixing jig in the conveying direction; and a controller for determining a timing to move downward the first cutter and the second cutter from a detection value detected by the conveyance-position sensor and operating the first driving part to move downward the first cutter and the second cutter.

With the above configuration (5), it is possible to accurately determine the timing to move downward the first cutter and the second cutter from the detection value of the conveyance-position sensor, and thereby it is possible to perform shoulder incision making without errors.

(6) In some embodiments, in the above configuration (5), the pair of blades constituting each of the first cutter and the second cutter is configured such that a distance between the pair of blades is adjustable, and is disposed at symmetric positions with respect to the center line in a direction intersecting with the conveying direction. The shoulder incision-making apparatus further includes: a second driving part for moving the pair of blades in the direction intersecting with the conveying direction; and a contour measurement part for measuring a contour shape of the poultry carcass, disposed in the conveyance path at an upstream side of the first cutter in the conveying direction. The controller is configured to determine the distance between the pair of blades on the basis of a measurement value measured by the contour measurement part and to determine the timing to move downward the first cutter and the second cutter on the basis of the detection value detected by the conveyance-position sensor and the measurement value measured by the contour measurement part.

With the above configuration (6), the distance between the pair of blades is adjusted on the basis of the measurement value of the contour-shape measurement part, and thus it is possible to accurately cut the shoulder joint section even if the size and the shape are varied between individual poultry carcasses.

Furthermore, the timing to move downward the first cutter and the second cutter is determined on the basis of the detection value of the conveyance-position sensor and the measurement value of the contour measurement part, and thereby it is possible to perform shoulder incision making without errors.

(7) In some embodiments, in any one of the above configurations (2) to (6), the base portion of the fixing jig is rotatably mounted to the conveyer via a support shaft. The inclination-angle defining part includes a cam roller disposed on the fixing jig and a cam rail extending along the conveyor. The cam roller is configured to run on the cam rail in engagement with the cam rail.

With the above configuration (7), the inclination-angle defining part has the above configuration, and thereby it is possible to simplify the configuration and to reduce the costs for the inclination-angle defining part, and to accurately achieve a set inclination angle.

(8) In some embodiments, in the above configuration (6) or (7), the contour measurement part includes: a contact element disposed in the conveyance path of the fixing jig, supported movably in an upward and downward direction, and being capable of contacting a measurement-target part of the poultry carcass; a vertical-position sensor configured to detect a position of the contact element in a vertical direction; a conveyance-position sensor configured to detect the position of the fixing jig in the conveying direction; and a contour calculation part configured to obtain the contour shape of the poultry carcass individually on the basis of detection values detected by the vertical-position sensor and the conveyance-position sensor.

With the above configuration (8), the contact element is caused to follow the poultry carcass to obtain the contour shape of the poultry carcass, and thereby it is possible to obtain the contour shape of each poultry carcass accurately. Accordingly, it is possible to perform shoulder incision making accurately in accordance with the individual variability of poultry carcasses. Furthermore, the conveyance-position sensor detects the position of the fixing jig in the conveying direction, and thereby it is possible to determine a timing to move downward the first cutter and the second cutter toward the poultry carcass at the incision-making position.

(9) In some embodiments, in the above configuration (6) or (7), the contour measurement part includes: an image capturing part for capturing an image of the poultry carcass, disposed upstream of the first cutter in the conveying direction; and an image processing part for obtaining the contour shape of the poultry carcass from the image captured by the image capturing part.

With the above configuration (9), the contour shape of the poultry carcass is determined from the image captured by the image-capturing part, and thereby it is possible to determine the contour shape of the poultry carcass more wholly than in the case where the contact element is used.

(10) In some embodiments, in any of the above configurations (5) to (9), the measurement target part of the poultry carcass is a shoulder section. With the above configuration (9), the contour shape of the shoulder section of each poultry carcass is measured, and thereby it is possible to determine the position of the shoulder joint section of each poultry carcass accurately, regardless of the individual variability of poultry carcasses.

(11) A method, according to at least one embodiment of the present invention, of making an incision on a shoulder of a poultry carcass for cutting a shoulder joint section of a poultry carcass, comprises: a workpiece positioning step of placing a poultry carcass which is eviscerated and which has leg parts removed on a plurality of fixing jigs mounted to a conveyer forming a conveyance path of the poultry carcass along a conveying direction so that a breast section of the poultry carcass faces forward or backward in the conveying direction; a workpiece conveying step of conveying the plurality of fixing jigs along the conveyance path set in advance; an incision-making step of making an incision on a shoulder joint section of the poultry carcass with a first cutter disposed above the conveyance path, while conveying the plurality of fixing jigs along the conveyance path; and a cutting step of cutting the shoulder joint section of the poultry carcass by inserting a second cutter into the incision, the second cutter being disposed above the conveyance path at a downstream side of the first cutter in the conveying direction.

According to the above method (11), the shoulder joint section of the poultry carcass is cut while the poultry carcass is being conveyed by the conveyor, and thus the first cutter and the second cutter are simply disposed in the conveyance path of the poultry carcass with no need to provide a device to move the cutters. Thus, an extensive apparatus is not required, and the incision making works can be automated at low cost.

Furthermore, it is possible to perform the shoulder incision-making step successively on the poultry carcasses placed on the fixing jigs being carried, and thus to enhance processing efficiency.

Still further, the cutting step is performed in two stages: the first cutter firstly makes an incision on the shoulder joint section, and the second cutter is positioned readily by using the incision as a target.

(12) In some embodiments, in the above method (11), each of the plurality of fixing jigs is mounted rotatably about a base portion of the fixing jig in the conveying direction. The incision-making step and the cutting step include a position adjusting step of rotating the fixing jig within a plane extending along the conveying direction to vary a position of the fixing jig relative to the first cutter or the second cutter.

According to the above method (12), the position of the fixing jig relative to the first cutter and the second cutter is adjusted, and thereby it is possible to select incision positions and to adjust incision amounts for the poultry carcass.

Advantageous Effects

According to at least one embodiment of the present invention, it is possible to automate shoulder incision-making works for a poultry carcass at low cost, and to improve processing efficiency.

The shoulder incision-making apparatus and the shoulder incision-making method according to the present invention can be incorporated into a series of processing steps for butchering and deboning poultry carcasses.

DETAILED DESCRIPTION

Figure 1:
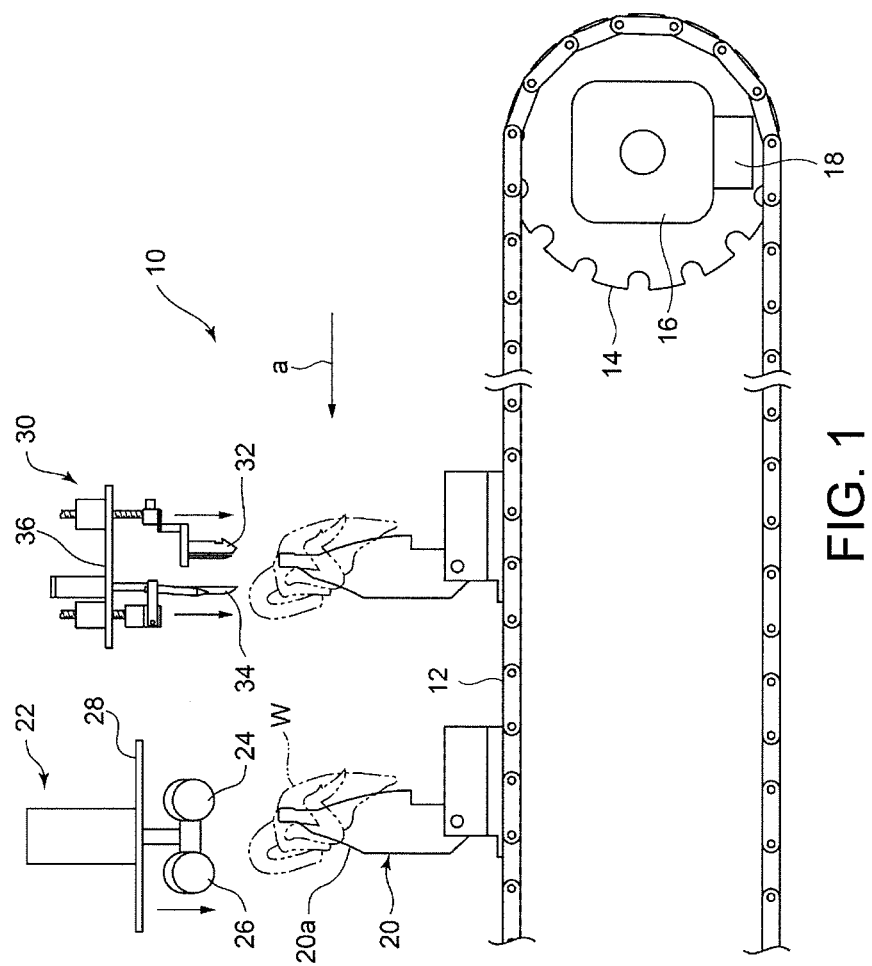
FIG. 1 is an overall schematic diagram of a shoulder incision-making apparatus according to an embodiment.

With reference to the accompanied drawings, some embodiments of the present embodiments will be described. It is intended, however, that unless particularly specified, dimensions, materials, shapes, relative positions and the like of components described in the embodiments or illustrated in the drawings shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

As depicted in FIG. 1, a shoulder incision-making apparatus 10 according to at least one embodiment of the present invention includes a fixing jig 20 for placing and fixing a poultry carcass (hereinafter, referred to as "workpiece") which is eviscerated and which has leg parts removed, and a conveyor 12 which forms a conveyance path of the fixing jig 20 and carries the fixing jig 20 along the conveyance path.

In the depicted embodiment, the conveyor 12 is a chain conveyor 12 of an endless shape disposed in a horizontal direction. The chain conveyor 12 is wound around a driving sprocket 14 at a front side, and the driving sprocket 14 is driven by a motor 16. The chain conveyor 12 is wound around a driven sprocket (not depicted) at a rear side.

A plurality of fixing jigs 20 is mounted to the conveyor 12 along the conveying direction, each including a mount part 20a on which a workpiece W is to be placed, and conveyed by the chain conveyor 12 at a constant speed, for instance.

The shoulder incision-making apparatus 10 includes a shoulder incision-making part 22 in the conveyance path. The shoulder incision-making part 22 includes a first cutter 24 and a second cutter 26 disposed above the chain conveyor 12, and the second cutter 26 is disposed downstream of the first cutter 24 in the conveying direction.

During operation of the shoulder incision-making apparatus 10, the chain conveyor 12 moves in the conveying direction, and an operator places a workpiece W onto the mount part 20a of the fixing jig 20. When the workpiece W reaches the incision-making part 22, the first cutter 24 makes an incision between a shoulder joint section and an upper-arm bone head of the workpiece W, and the second cutter 26 inserts a cutter blade into the incision to cut apart the upper-aim bone and the shoulder joint section.

The first cutter 24 and the second cutter 26 may be fixed flush with the workpiece W placed on the fixing jig 20, or may be disposed above the conveyance path of the workpiece W as in the depicted embodiment and configured to be moved downward toward the workpiece W in accordance with the timing when the workpiece W reaches the shoulder incision-making part 22.

In the depicted embodiment, a shoulder-blade incision-making part 30 is disposed at an upstream side of the shoulder incision-making part 22 in the conveying direction. The shoulder-blade incision-making part 30 includes a first scraper 32 to be inserted into an outer side of a collar bone, and a second scraper 34 to be inserted into a surface of a shoulder blade. The scrapers individually move downward at the timing when the workpiece W reaches below the respective scrapers. The first scraper 32 peels a meat portion attached to the collar bone and the second scraper 34 peels a meat portion attached to the shoulder blade.

It is possible to butcher and debone a workpiece W readily with the shoulder-blade incision-making part 30.

Figure 2:
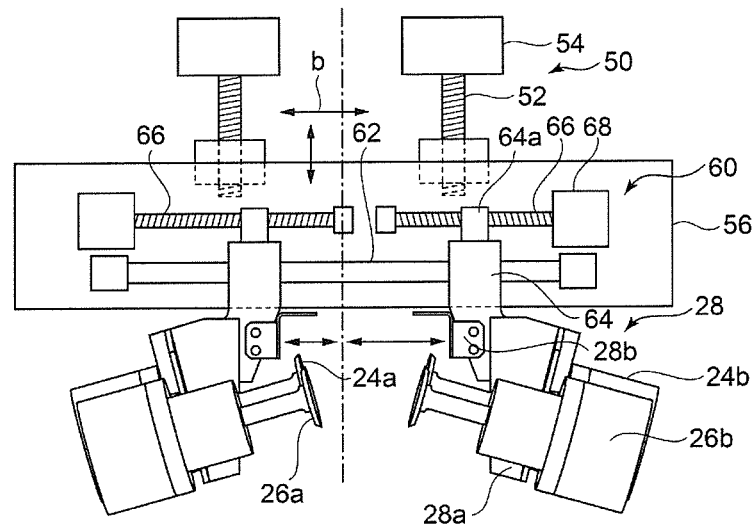
FIG. 2 is a front view of a shoulder incision-making apparatus according to an embodiment.
Figure 3:
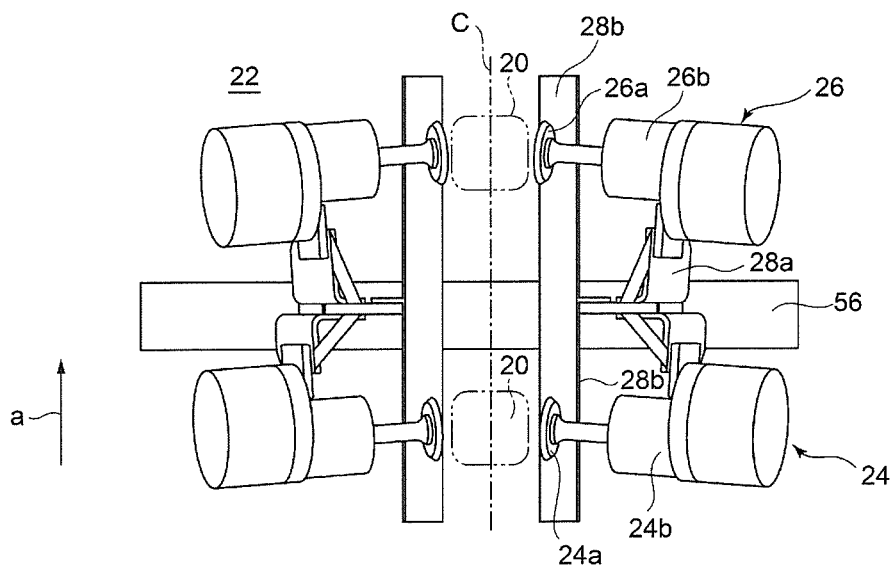
FIG. 3 is a bottom view of a shoulder incision-making apparatus according to an embodiment.

In an exemplary embodiment, as depicted in FIGS. 2 and 3, the first cutter 24 and the second cutter 26 include a pair of blades 24a and a pair of blades 26a, respectively, each pair being disposed symmetrically with respect to the center line C passing through the center of the fixing jig 20 in a direction intersecting with the conveying direction (i.e., a direction of arrow b orthogonal to the center line C) along the conveying direction.

In the depicted embodiment, the pair of blades 24a and the pair of blades 26a are round blades rotated by a motor 24b and a motor 26b, respectively. The pair of blades 24a and the pair of blades 26a are coupled to a support board 56 via a bracket 28a and a pair of support plates 28b extending in the conveying direction.

In the depicted embodiment, the pair of blades 24a is disposed slightly lower relative to the pair of blades 26a.

Figure 4:
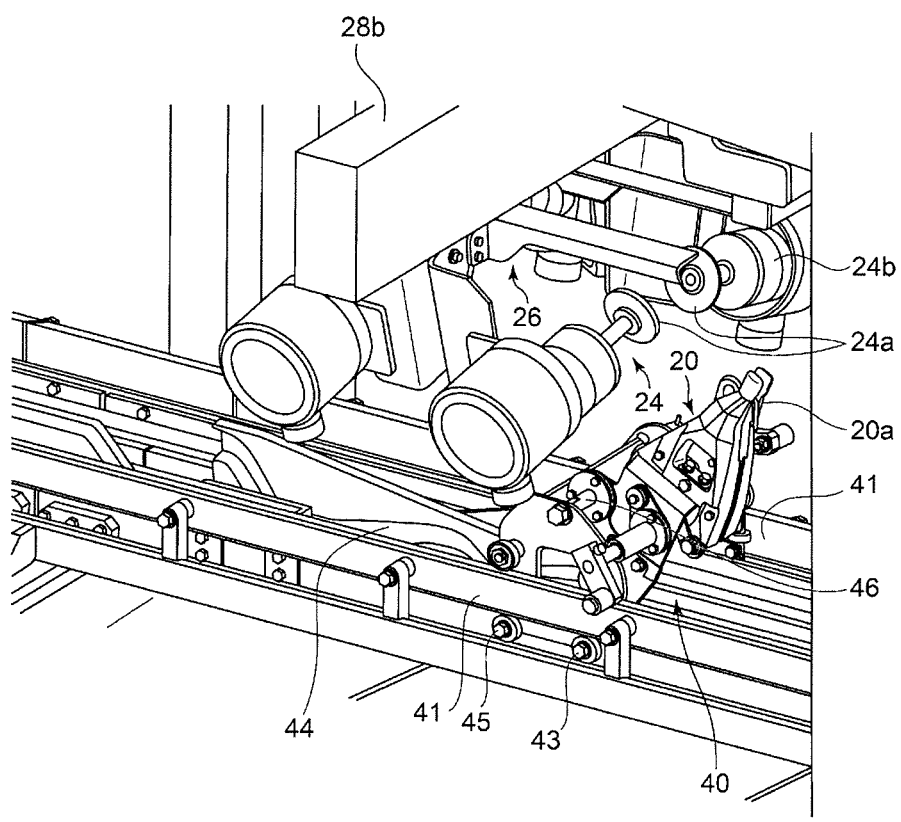
FIG. 4 is a perspective view of a shoulder incision-making apparatus according to an embodiment.
Figure 5:
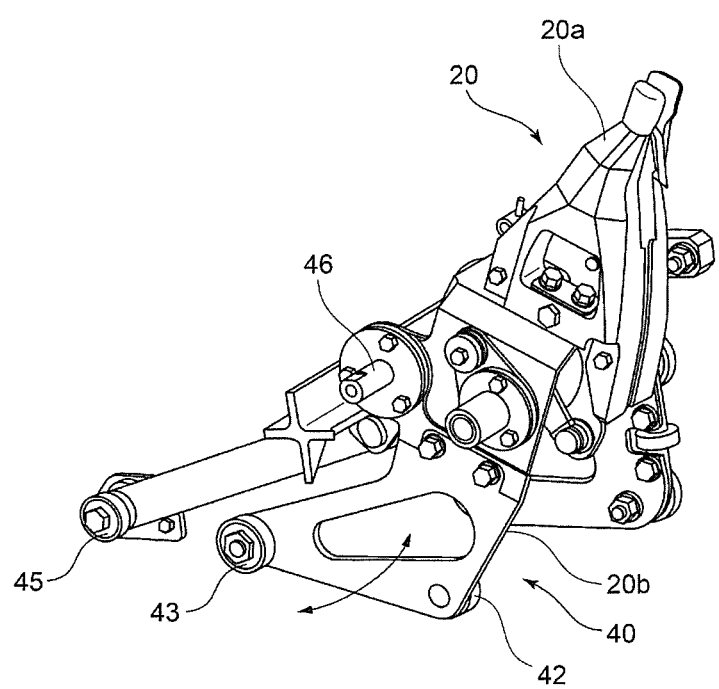
FIG. 5 is a perspective view of a fixing jig according to an embodiment.

In an exemplary embodiment, as depicted in FIGS. 4 and 5, the fixing jig 20 is mounted rotatably within a plane along the conveying direction about a base portion 20b of the fixing jig, relative to the chain conveyor 12. Furthermore, an inclination-angle defining part 40 is provided, for defining an angle of the fixing jig 20 with respect to the horizontal direction in accordance with a position in the conveying direction.

In an exemplary embodiment, the inclination-angle defining part 40 is, for instance, configured to tilt the fixing jig 20 toward the horizontal direction within a plane along the conveying direction immediately after the second cutter 26 cuts a shoulder joint section. Accordingly, it is possible to cut a shoulder joint section with the second cutter 26 while avoiding cutting a meat portion positioned downstream of the shoulder joint section in the conveying direction.

In the depicted embodiment, the fixing jig 20 is tilted toward upstream in the horizontal direction.

In an exemplary embodiment, as depicted in FIG. 4, the inclination-angle defining part 40 includes a cam roller 42 disposed on the fixing jig 20, and a cam rail 44 disposed on the chain conveyor 12 along the conveying direction. The cam roller 42 runs on the cam rail 44 in engagement with the cam rail 44.

During conveyance of the fixing jig 20, the position of the cam roller 42 in the vertical direction is restricted by the cam rail 44, and thereby the fixing jig 20 rotates about the center shaft 46 serving as a rotational center. Accordingly, during shoulder incision making, it is possible to adjust the position of the fixing jig 20 relative to the first cutter 24 and the second cutter 26, and to adjust positions and amounts of incisions made by the first cutter 24 and the second cutter 26 on the workpiece W.

In the depicted embodiment, rails 41 are disposed along the chain conveyor 12 on either side of the chain conveyor 12. The rollers 43 and 45 disposed on the base portion 20b of the fixing jig 20 run on the rail 41 while being in contact with a face of the rail 41. The fixing jig 20 rotates about the center shaft 46 due to upward and downward movement of the cam roller 42.

In an exemplary embodiment, the first cutter 24 and the second cutter 26 are disposed above the fixing jig 20 so as to be capable of moving toward the fixing jig 20. The cutters are lowered by the first driving part 50 depicted in FIG. 2 when the workpiece W is at the incision-making part 22, cut the shoulder joint section of the workpiece W, and then move upward to the original position.

Further, a conveying-position sensor is provided which detects a position of each fixing jig 20 in the conveying direction. In the depicted embodiment, the conveying-position sensor is an encoder 18 (see FIG. 1) which is disposed on the motor 16 and which detects the position of each fixing jig 20 in the conveying direction from a reference point (e.g. the position of the motor 16) of the conveyance path.

Furthermore, a controller 84 (see FIG. 7) is provided which determines a timing to move downward the first cutter 24 and the second cutter 26 from a detection value of the conveying-position sensor, and operates the first driving part 50 to lower the first cutter 24 and the second cutter 26.

In the depicted embodiment, the first driving part 50 includes a screw shaft 52 disposed on the support board 56 and screwed with the support board 56, and a servomotor 54 for rotating the screw shaft 52. The servomotor 54 rotates the screw shaft 52 to move the support board 56 upward.

In an exemplary embodiment, the pair of blades 24a and the pair of blades 26a are each disposed symmetric with respect to the center line C in the direction of arrow b, and configured such that a distance between the two blades is adjustable. As depicted in FIG. 2, the second driving part 60 is provided which adjusts the distance by moving the pair of blades 24a and the pair of blades 26a in the direction of arrow b.

In the depicted embodiment, the second driving part 60 includes a slide rail 62 fixed on the support board 56 in the horizontal direction. A pair of support plates 28b and a slide 64 are engaged slidably with the slide rail 62. Above the slide rail 62, a screw shaft 66 and a servomotor 68 for rotating the screw shaft 66 are fixed to the support board 56. The slide 64 includes a female screw portion 64a engaging with the screw shaft 66.

The servomotor 68 rotates the screw shaft 66, and thereby the first cutter 24 and the second cutter 26 are slided in a direction orthogonal to the conveying direction (direction of arrow b).

Figure 6:
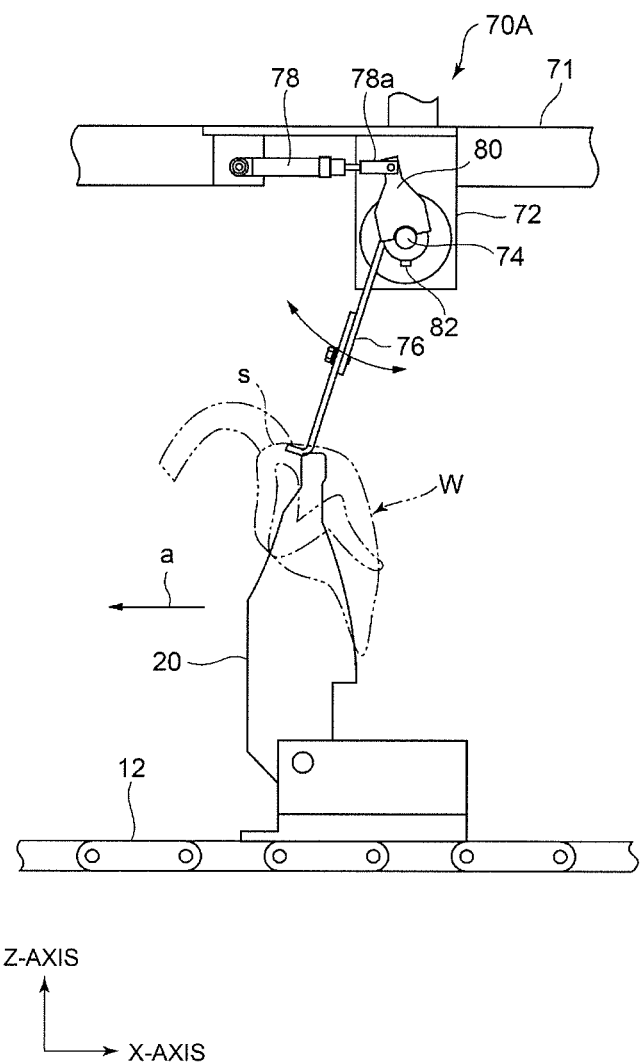
FIG. 6 is a front view of a contour measurement part according to an embodiment.

In an exemplary embodiment, a contour measurement part 70 for measuring a contour shape of the workpiece W is disposed above the chain conveyor 12, and upstream of the first cutter 24 in the conveying direction as depicted in FIG. 6, or upstream of the shoulder-blade incision-making part 30 if the shoulder-blade incision-making part 30 is provided. Furthermore, the controller 84 determines the distance between the pair of blades 24a and between the pair of blades 26a on the basis of a measurement value measured by the contour measurement part 70, and determines a timing to move downward the first cutter 24 and the second cutter 26 on the basis of a detection value detected by the encoder 18 and a measurement value measured by the contour measurement part 70.

Figure 7:
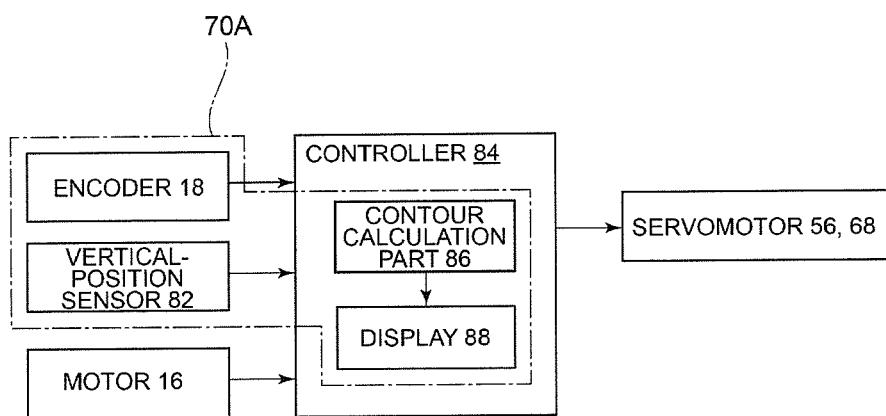
FIG. 7 is a block diagram of a control system of a contour measurement part according to an embodiment.

In an exemplary embodiment, as depicted in FIGS. 6 and 7, the contour measurement part 70A includes a contact element 76 disposed in the conveyance path of the fixing jigs 20, a vertical-position sensor 82 for detecting the position of the contact element 76 in the vertical direction, the encoder 18 for detecting the position of each fixing jig 20 in the conveying direction, and a contour calculation part 86. The contact element 76 is supported movably upward and downward and capable of being in contact with a measurement-target part of the workpiece W being carried. The contour calculation part 86 calculates the contour of each workpiece W on the basis of detection values of the vertical-position sensor 82 and the encoder 18.

In an exemplary embodiment, the measurement-target portion of the workpiece W is a shoulder section S, and it is possible to perform shoulder incision making accurately by measuring the contour shape of the shoulder section S.

In the depicted embodiment, as shown in FIG. 6, the contour measurement part 70A includes a measurement block 72 mounted to a support frame 71 disposed above the conveyance path of the fixing jigs 20. The measurement block 72 supports a support shaft 74 revolvably, and an end of a contact element 76 of a bar shape is coupled to the support shaft 74. The contact element 76 is supported pivotally about the support shaft 74.

The measurement block 72 includes an air cylinder 78 which includes a piston rod 78a connected to the support shaft 74 via an arm 80. The other end of the contact element 76 is positioned so as to be in contact with the shoulder section S of the workpiece W moving in on the conveyance path of the fixing jig 20. When the contact element 76 comes into contact with the shoulder section S of the workpiece W, a biasing force (elastic force) of the air cylinder 78 is applied to the contact element 76, whereby the contact element 76 can follow the surface of the shoulder section S. The support shaft 74 is provided with a vertical-position sensor 82 for measuring a rotational angle of the support shaft 74.

FIG. 7 is a diagram of the control system of the contour measurement part 70A. The controller 84 controls the motor 16 to control the conveying speed of the fixing jigs 20. A measurement signal of the vertical-position sensor 82 is inputted into the contour calculation part 86 of the controller 84. The contour calculation part 86 calculates a contact position at which the contact element 76 is in contact with the workpiece W from the length of the contact element 76 in the axial direction and an angle formed between a reference line and the contact element 76 in contact with the workpiece W, by using polar coordinates. The calculated value thereof is combined with the positional information of the fixing jig 20 inputted from the encoder 18, and thereby a contour shape (profile) of the workpiece W is obtained.

The incision-making part 22 includes a display part (not depicted) for showing the accordingly obtained contour shape of the workpiece W. The display part includes a display 88 for showing the contour shape of the workpiece W.

Figure 8:
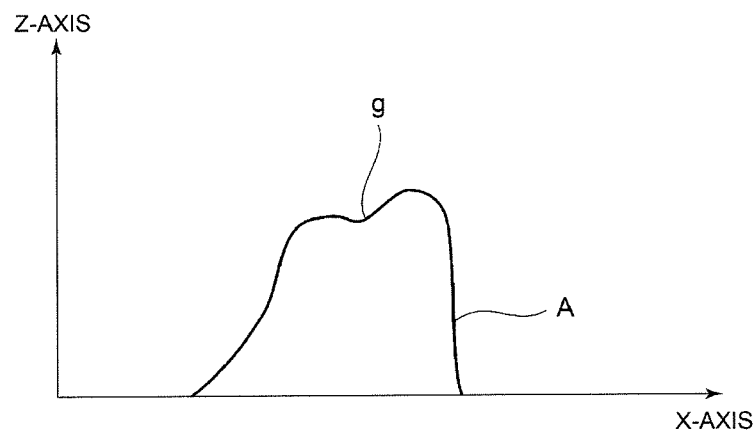
FIG. 8 is a diagram of a contour profile of a poultry carcass.

FIG. 8 is a diagram shown on the display 78. In the drawing, line A is the contour shape of the shoulder section S of the workpiece W measured with the contact element 76. In the drawing, X-axis is a coordinate axis in the conveying direction (direction of arrow a), and Z-axis is a coordinate axis in the vertical direction. In the drawing, for instance, even if the contour shape of the workpiece W has a recessed portion g, it is possible to show the contour shape of the workpiece W clearly on the display 88.

The controller 84 operates the servomotor 68 of the second driving part 60 to adjust the distance between the pair of blades 24a and between the pair of blades 26a, and determines a timing to move downward the first cutter 24 and the second cutter 26, on the basis of the detection value of the encoder 18 and the contour-shape profile of the workpiece W measured by the contour measurement part 80. Further, the controller 84 operates the servomotor 54 of the first driving part 50 on the basis of the timing to move the cutters downward to perform shoulder incision making.

Figure 9:
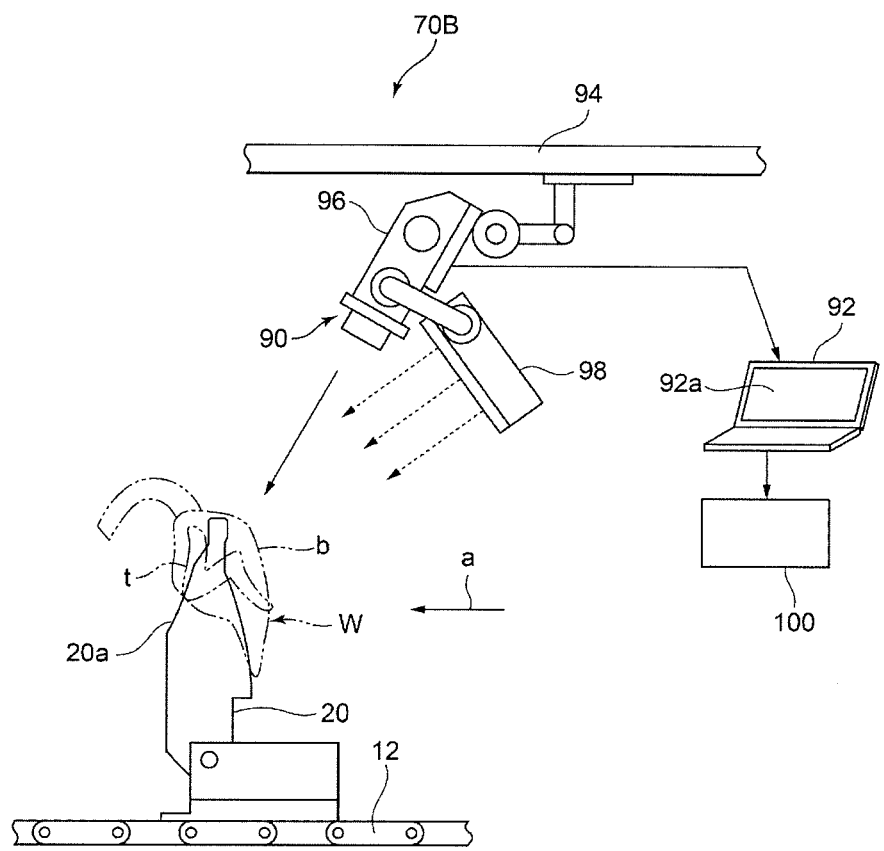
FIG. 9 is a front view of a contour measurement part according to an embodiment.

In an exemplary embodiment, as depicted in FIG. 9, the contour measurement part 70B is disposed upstream of the first cutter 24 in the conveying direction, or upstream of the shoulder-blade incision-making part 30 if the shoulder-blade incision-making part 30 is provided, and includes an image capturing part 90 for capturing an image of the workpiece W, and an image processing part 92 for obtaining the contour shape of the workpiece W from an image captured by the image capturing part 90.

In the depicted embodiment, the image capturing part 90 includes a digital camera 96 fixed to a support frame 94 disposed above the conveyance path, and an LED lighting device 98 mounted to the digital camera 96.

The LED lighting device 98 lights up the workpiece W, and the digital camera 96 captures an image of the workpiece W. The image captured by the digital camera 96 is inputted into the image processing part 92 comprising a computer, a personal computer, or the like.

The image processing part 92 calculates a contour profile of the workpiece W by performing known image processing on the captured image, such as filtering, binarizing or gray-scaling, and labeling or edge-extracting. The display 92a shows the calculated contour profile.

The controller 100 operates the servomotor 68 of the second driving part 60 to adjust the distance between the pair of blades 24a and between the pair of blades 26a, and determines a timing to move downward the first cutter 24 and the second cutter 26, on the basis of the calculated contour profile. Further, the controller 84 operates the servomotor 54 of the first driving part 50 on the basis of the timing to move the cutter downward to perform shoulder incision making.

Figure 10:
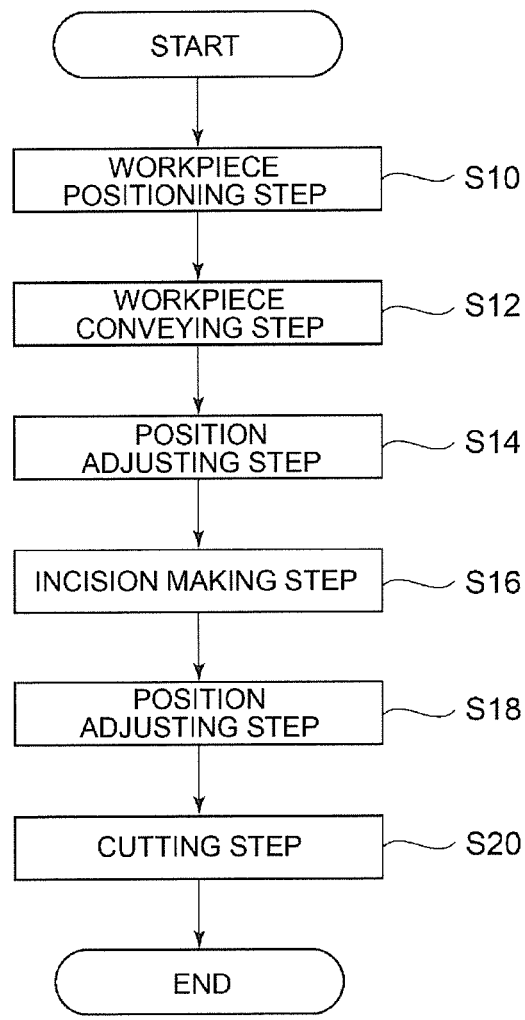
FIG. 10 is a flowchart of a shoulder incision-making method according to an embodiment.

FIG. 10 is a flowchart of a shoulder incision-making step according to at least one embodiment. First, in the workpiece positioning step S10, the workpiece W is placed on the mount part 20a of each fixing jig 20 mounted to the chain conveyor 12 so that the breast section of the workpiece W faces forward or backward in the conveying direction. In the workpiece conveying step S12, the fixing jig 20 with the workpiece W placed thereon is carried along the conveyance path formed by the chain conveyor 12.

At the incision-making part 22, an incision is made on the workpiece W carried thereto with the first cutter 24, between the shoulder joint section and the upper-arm bone head of the workpiece W (incision-making step S16). Next, the second cutter 26 is inserted into the incision to cut the upper-arm bone apart from the shoulder joint section (cutting step S20).

In an exemplary embodiment, before the incision-making step S16, the fixing jig 20 is rotated within a plane along the conveying direction, and the position of the fixing jig 20 relative to the first cutter 24 is adjusted (position adjusting step S14). Furthermore, before the cutting step S20, the fixing jig 20 is pivoted within a plane along the conveying direction, and the position (in the vertical direction and the conveying direction) of the fixing jig 20 relative to the second cutter 26 is adjusted (position adjusting step S18).

Figure 11:
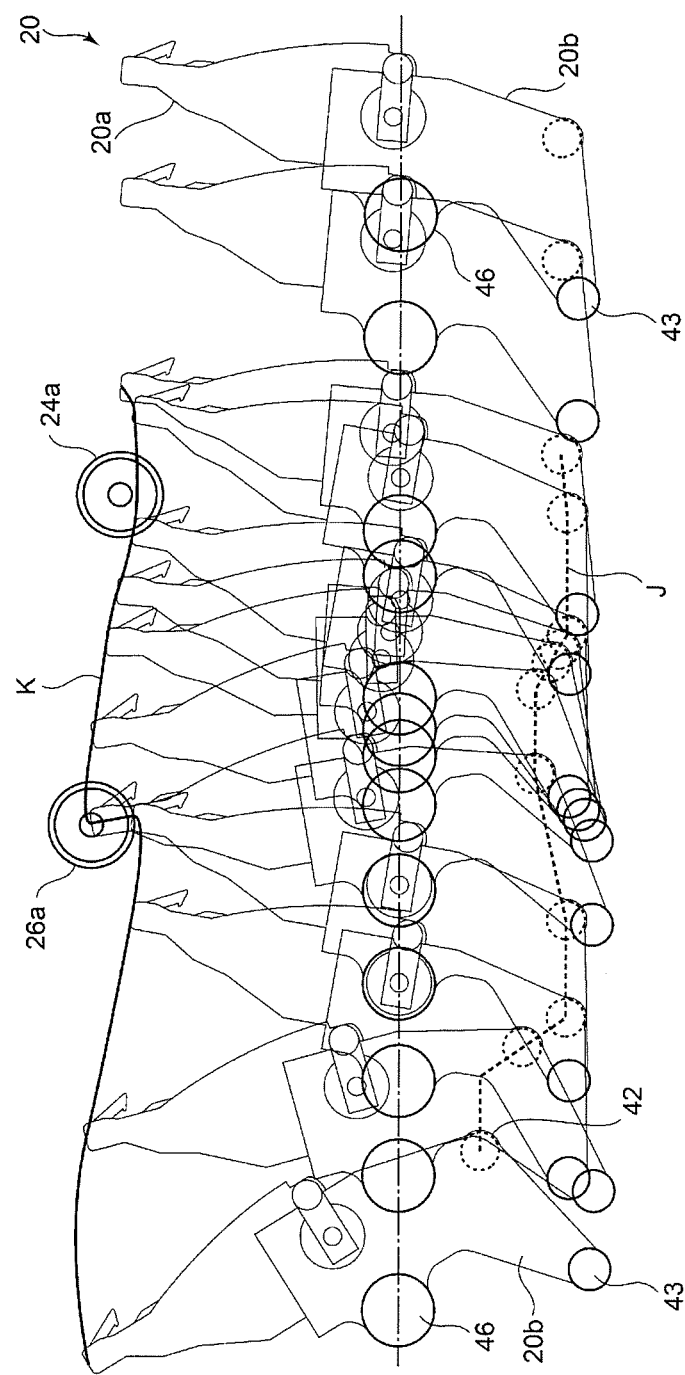
FIG. 11 is an explanatory diagram of a trajectory of motion of a fixing jig.

Accordingly, the position of the fixing jig 20 relative to the first cutter 24 and the second cutter 26 is adjusted, and thereby it is possible to select incision positions and to adjust incision amounts for the workpiece W, as depicted in FIG. 11.

In FIG. 11, line J is a trajectory of the cam roller 42 during shoulder incision making, and line K is a trajectory of a top portion of the fixing jig 20. In the incision-making step S16, the position of the fixing jig 20 relative to the first cutter 24 is determined so that an incision is formed between the shoulder joint section and the upper-arm bone head.

In the cutting step S20, the fixing jig 20 moves upward below the second cutter 26, so that the second cutter 26 cuts the shoulder joint section and the upper-arm bone head apart, and then the fixing jig 20 quickly tilts toward upstream in the conveying direction to move away from the second cutter 26.

Figure 12:
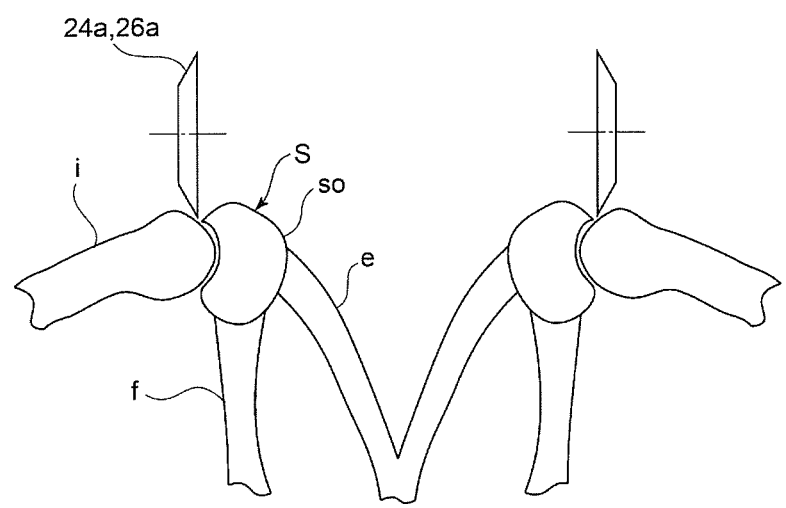
FIG. 12 is an explanatory diagram of a skeleton of a poultry carcass.

FIG. 12 is a view of the workpiece W seen in front of the breast, schematically showing the skeleton of the workpiece W and the cutting position of the shoulder joint section "so". A collar bone "e", a coracoid bone "f", and an upper-arm bone "i" are joined to the shoulder joint section "so". In the incision-making step S16, the pair of blades 24a makes incisions between shoulder joint sections "so" and upper-arm bone heads. In the cutting step S20, the pair of blades 26a cut the shoulder joint sections "so" and the upper-arm bone heads apart.

Figures 13A, 13B, 13C, 13D:
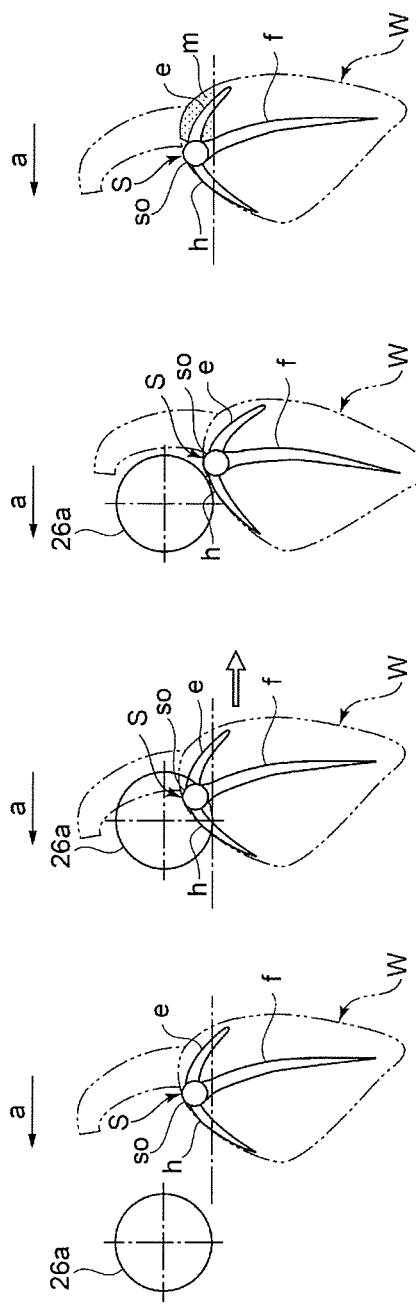
FIGS. 13A to 13D are explanatory diagrams of an incision-making step for a shoulder joint section of a poultry carcass.

FIGS. 13A to 13D are side views of the workpiece W, similarly to FIG. 1, and a collar bone e, a coracoid bone f, and a shoulder blade h are joined to a shoulder joint section "so". In FIGS. 13A to 13D, the workpiece W is placed on the fixing jig 20 so that the breast section d faces upstream in the conveying direction, the drawings showing the cutting step S20 in order. As depicted in FIG. 13C, immediately after the second cutter 26 cuts the shoulder joint section "so", the fixing jig 20 is tilted toward upstream in the conveying direction. Accordingly, it is possible to cut the shoulder joint section "so" with the second cutter 26 while avoiding cutting a meat portion m positioned downstream of the shoulder joint section "so" in the conveying direction.

In some embodiments, as depicted in FIG. 1, the shoulder joint section "so" of the workpiece W is cut while conveying the workpiece W with the chain conveyor 12, and the shoulder incision-making part 22 is simply disposed in the conveyance path of the workpiece W with no need to provide a device for moving the shoulder incision-making part 22. Accordingly, it is possible to simplify the configuration and reduce the costs for the shoulder incision-making part 22, and to automate incision making at low cost.

Furthermore, it is possible to perform the shoulder incision-making step successively on workpieces W placed on a plurality of fixing jigs 20 carried on the conveyor, and thus to enhance processing efficiency.

Still further, shoulder incision making is performed in two stages: the first cutter 24 firstly makes an incision on the shoulder joint section "so", and the second cutter 26 uses the incision as a target for positioning, which makes it possible to position the second cutter 26 readily.

In an exemplary embodiment, as depicted in FIGS. 4 and 5, the angle of the fixing jig 20 with respect to the horizontal direction is defined by the inclination-angle defining part 40 during shoulder incision making, and thereby the position of the fixing jig 20 relative to the first cutter 24 and the second cutter 26 can be adjusted, which makes it possible to select incision positions and to adjust incision amounts for the workpiece W.

Furthermore, the fixing jig 20 is tilted toward the horizontal direction toward the upstream side in the conveying direction immediately after the second cutter 26 cuts the shoulder joint section "so", and thereby it is possible to cut the shoulder joint section "so" while avoiding cutting a meat portion m positioned downstream of the shoulder joint section "so" in the conveying direction.

Accordingly, it is possible to improve the product value of the meat portion m separated from the shoulder joint section after butchering.

In an exemplary embodiment, as depicted in FIG. 3, each pair of the pair of blades 24a and the pair of blades 26a respectively constituting the first cutter 24 and the second cutter 26 is disposed on symmetric positions with respect to the center line C passing through the center of the fixing jig 20 along the conveying direction in a direction orthogonal to the conveying direction, and thereby it is possible to place the cutter blades on the both shoulder joint sections "so" of the workpiece W readily.

In an exemplary embodiment, as depicted in FIG. 1, the first cutter 24 and the second cutter 26 are disposed above the fixing jig 20 so as to be capable of moving down toward the fixing jig 20, and the controller 84 determines a timing to lower the cutters on the basis of the position in the conveying direction detected by the encoder 18, and thereby it is possible to determine the timing to move downward the cutters accurately and to perform shoulder incision making without errors.

In an exemplary embodiment, as depicted in FIG. 6, the pair of blades 24a and the pair of blades 26a are disposed on positions symmetric with respect to the center line C in a direction orthogonal to the conveying direction, and configured such that the distance between the pair of blades is adjustable, and the contour measurement part 70a is provided, the controller 84 determining the distance between the pair of blades 24a and the pair of blades 26a on the basis of the contour shape of the workpiece W measured by the contour measurement part 70a, and thereby it is possible to cut the shoulder joint section "so" accurately regardless of the individual variability in the size and shape of workpieces W.

Furthermore, the controller 84 determines the timing to lower the pair of blades 24a and the pair of blades 26a on the basis of a detection value of the encoder 18 and a measurement value of the contour measurement part 70A, and thereby it is possible to perform shoulder incision making without operational errors.

In an exemplary embodiment, as depicted in FIGS. 4 and 5, the base portion 20b of the fixing jig 20 is mounted rotatably to the chain conveyor 12 via the center shaft 46, and the inclination-angle defining part 40 includes the cam roller 42 and the cam rail 44, which makes it possible to simplify the configuration and reduce the costs for the inclination-angle defining part 40, and to achieve a set inclination angle accurately.

In an exemplary embodiment, the contour measurement part 70A includes the contact element 66, the vertical-position sensor 82, the encoder 18, and the contour calculation part 86, and the contour shape of a workpiece W is obtained by causing the contact element 66 to follow the workpiece W, which enables accurate determination of the contour shape of each workpiece W. Accordingly, it is possible to perform shoulder incision making accurately in accordance with the individual variability of workpieces W.

Furthermore, the encoder 18 detects the position of the fixing jig 20 in the conveying direction, and thereby it is possible to determine a timing to lower the first cutter 24 and the second cutter 26 toward the workpiece W at the incision-making position.

In an exemplary embodiment, the contour measurement part 70B includes the image capturing part 90 and the image processing part 92, and thus can determine the contour shape of a workpiece more wholly than the contour measurement part 80A.

In an exemplary embodiment, the contour shape of the shoulder section S, which is defined as a measurement target part of the workpiece W, is measured, and thereby it is possible to determine the position of the shoulder joint section "so" of each workpiece W accurately, regardless of the individual variability of workpieces W.

INDUSTRIAL APPLICABILITY

According to at least one embodiment of the present invention, it is possible to automate shoulder incision making for a poultry carcass of a domestic fowl such as a chicken at low cost, and to improve processing efficiency.

The invention claimed is:

1. A shoulder incision-making apparatus for a poultry carcass for cutting a shoulder joint section of a poultry carcass, comprising:
   a fixing jig on which a poultry carcass which is eviscerated and which has leg parts removed is to be placed and fixed;
   a conveyer forming a conveyance path of the fixing jig and configured to convey the fixing jig along the conveyance path;
   a group of cutters disposed in the conveyance path, including a cutter to make an incision on the shoulder joint section of the poultry carcass and a cutter to be inserted into the incision to cut the shoulder joint section,
   wherein the fixing jig is mounted to the conveyer rotatably about a base portion of the fixing jig within a plane extending along a conveying direction, and includes an inclination-angle defining part for defining an angle of the fixing jig with respect to a horizontal direction in accordance with a position in the conveying direction so that a cutter incision position is selectable and a cutter incision amount is adjustable for the poultry carcass with the inclination-angle defining part, and
   wherein the cutter to make an incision is configured to make an incision at the cutter incision position selected on the shoulder joint section, and the cutter to cut the shoulder joint section is configured to be inserted into the incision to cut the shoulder joint section by using the incision as a target.

2. The shoulder incision-making apparatus according to claim 1, wherein
   the inclination-angle defining part is configured to tilt the fixing jig toward the horizontal direction immediately after the cutter to cut the shoulder joint section cuts the shoulder joint section.

3. The shoulder incision-making apparatus according to claim 1, wherein
   each of the cutter to make an incision and the cutter to be inserted into the incision to cut the shoulder joint section comprises a pair of blades disposed at symmetric positions in a direction intersecting with the conveying direction with respect to a center line passing through a center of the fixing jig along the conveying direction.

4. The shoulder incision-making apparatus according to claim 1, wherein
   each of the cutter to make an incision and the cutter to be inserted into the incision to cut the shoulder joint section is disposed above the fixing jig and configured to be capable of moving downward toward the fixing jig, and
   wherein the shoulder incision-making apparatus further includes:
   a first driving part for moving downward the cutter to make an incision and the cutter to be inserted into the incision to cut the shoulder joint section;
   a conveyance-position sensor for detecting a position of the fixing jig in the conveying direction; and
   a controller for determining a timing to move downward the cutter to make an incision and the cutter to cut the shoulder joint section from a detection value detected by the conveyance-position sensor and operating the first driving part to move downward the cutter to make an incision and the cutter to cut the shoulder joint section.

5. The shoulder incision-making apparatus according to claim 4, wherein
   a pair of blades constituting each of the cutter to make an incision and the cutter to cut the shoulder joint section is configured such that a distance between the pair of blades is adjustable, and is disposed at symmetric positions with respect to a center line in a direction intersecting with the conveying direction,
   wherein the shoulder incision-making apparatus further includes:
   a second driving part for moving the pair of blades in the direction intersecting with the conveying direction; and
   a contour measurement part for measuring a contour shape of the poultry carcass, disposed in the conveyance path at an upstream side of the cutter to make an incision in the conveying direction, and
   wherein the controller is configured to determine the distance between the pair of blades on a basis of a measurement value measured by the contour measurement part and to determine the timing to move downward the cutter to make an incision and the cutter to cut the shoulder joint section on a basis of the detection value detected by the conveyance-position sensor and the measurement value measured by the contour measurement part.

6. The shoulder incision-making apparatus according to claim 1, wherein the base portion of the fixing jig is rotatably mounted to the conveyer via a support shaft, and wherein the inclination-angle defining part includes a cam roller disposed on the fixing jig and a cam rail disposed on the conveyer and extending along the conveying direction, the cam roller being configured to run on the cam rail in engagement with the cam rail.

7. The shoulder incision-making apparatus according to claim 5, wherein the contour measurement part includes:

an image capturing part for capturing an image of the poultry carcass, disposed upstream of the cutter to make an incision in the conveying direction; and an image processing part for obtaining the contour shape of the poultry carcass from the image captured by the image capturing part.

8. A method of making an incision on a shoulder of a poultry carcass for cutting a shoulder joint section of a poultry carcass, the method comprising:

a workpiece positioning step of placing a poultry carcass which is eviscerated and which has leg parts removed on a plurality of fixing jigs mounted to a conveyer forming a conveyance path of the poultry carcass along a conveying direction so that a breast section of the poultry carcass faces forward or backward in the conveying direction;

a workpiece conveying step of conveying the plurality of fixing jigs along the conveyance path set in advance;

an incision-making step of making an incision on a shoulder joint section of the poultry carcass with a cutter to make an incision disposed in the conveyance path, while conveying the plurality of fixing jigs along the conveyance path; and a cutting step of cutting the shoulder joint section of the poultry carcass by inserting a cutter at a downstream side of the cutter to make an incision in the conveying direction into the incision, wherein, while conveying the plurality of fixing jigs along the conveyance path, the plurality of fixing jigs are tilted toward a horizontal direction with an inclination-angle defining part defining an angle of the fixing jig with respect to the horizontal direction in accordance with a position in the conveying direction immediately after cutting the shoulder joint section to avoid cutting a meat portion disposed downstream of the shoulder joint section.

* * * * *